Sept. 11, 1951  W. A. BODGE  2,567,868
TOOL FOR SHARPENING AGRICULTURAL IMPLEMENTS
Filed March 16, 1950

WALTER A. BODGE
Inventor

By Hubert Miller
Attorney

Patented Sept. 11, 1951

2,567,868

UNITED STATES PATENT OFFICE 2,567,868

TOOL FOR SHARPENING AGRICULTURAL IMPLEMENTS

Walter A. Bodge, Portis, Kans., assignor to Harmon Machine Company, Inc., Wichita, Kans., a corporation of Kansas Application March 16, 1950, Serial No. 149,969

9 Claims. (Cl. 76—82)

This invention relates to a disc sharpening tool, and more particularly to a portable hand operated tool which may be used for sharpening discs in the field without removing the discs from the agricultural implement, and without disassembling the implement in any way.

Previously, in order to sharpen the discs on such implements, it has been necessary for the farmer to jack up and block the frame of the implement, remove the shafts on which the discs are fixed, remove each disc from its shaft, and then take the discs to the nearest machine shop to have them sharpened on a lathe or by a power grinder. The disassembly and reassembly of the implement required considerable time and was expensive, to say nothing of the loss of use of the machine for a considerable time.

I have conceived a method and apparatus for sharpening discs which eliminates removal of the discs and their shafts from the implement. The method consists in elevating the completely assembled implement to afford free rotation of the disc bearing shafts and their discs, forcibly rotating the shafts on which the discs are fixed, and forcibly applying a sharpening element to the edge of each disc in turn, during its forced rotation. A portable power unit for forcibly rotating the disc bearing shafts is fully disclosed in my patent application Serial No. D. 6,181, filed November 21, 1949. The present application relates to a manually held and operated sharpening tool which aids in carrying out the above described method.

It is an object of the invention to provide a tool which can be positioned on the ground adjacent a rotating disc to be sharpened, which can be manually moved on its base to receive the disc edge, and which can thereafter be manually manipulated to force the edge of the disc into positive engagement with a sharpening element carried by the tool, and which will thus sharpen the disc as it rotates.

Additional objects are to provide a tool of this type: which is readily variable in height; which is so mounted on its base that it may move to and fro during the sharpening operation to accommodate warped discs; which can be adjusted to produce a disc cutting edge of any desired angle; which is provided with a safety feature to prevent discs which have notched or otherwise damaged cutting edges from locking against the sharpening element and either breaking or damaging the element, or possibly injuring the operator; and which is capable of being adjusted and manually manipulated to completely cut off and remove from any disc a notched or damaged circumferential portion to provide a truly circular undamaged peripheral edge which may then be sharpened.

It is an additional object to provide a tool of this type which is capable of sharpening the discs on an implement regardless of how they are positioned on their respective shafts, that is, whether they are disked toward one end of the shaft or toward the other.

The invention, together with other objects attending its production, will be more clearly understood when the following description is read in connection with the accompanying drawings, in which.

Figures 1, 2, 3:
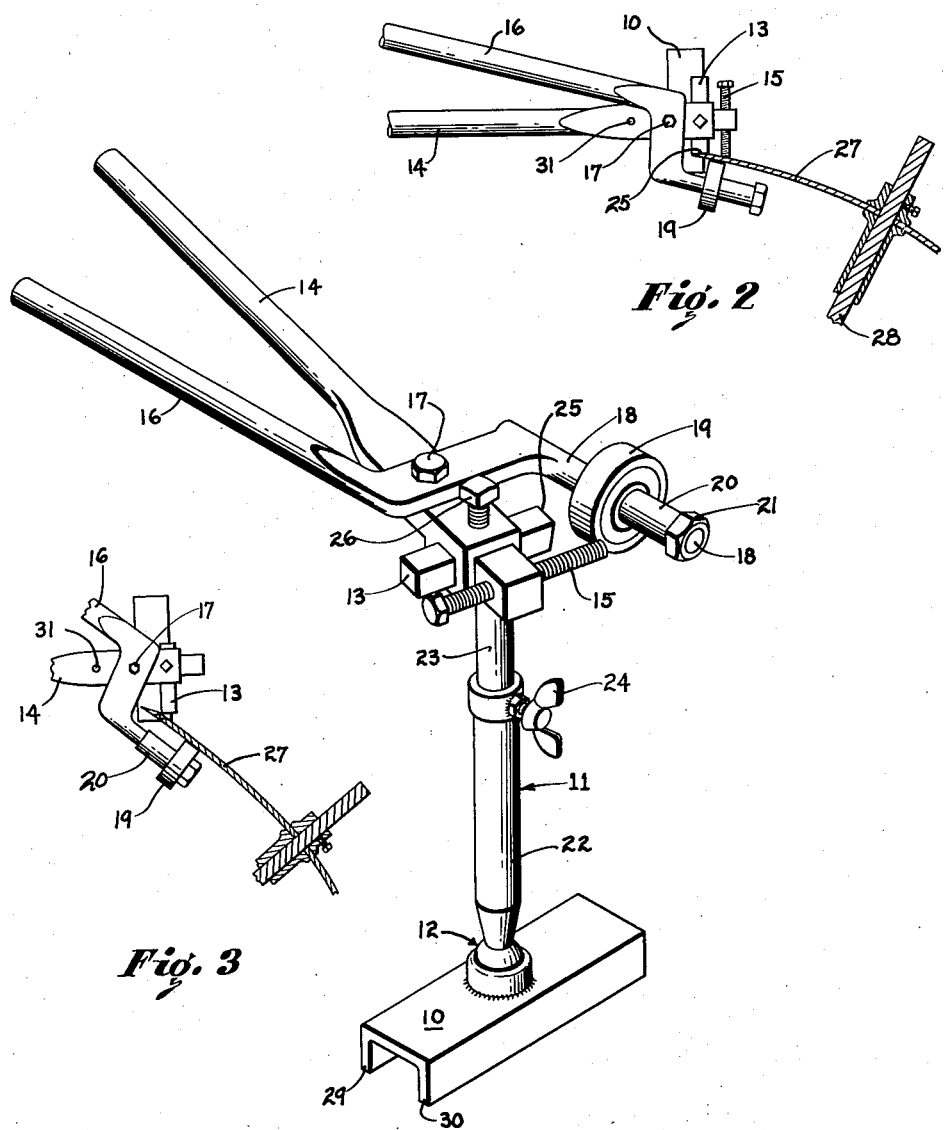
Fig. 1 is a perspective view of a tool embodying the invention.
Fig. 2 is a plan view of the same tool illustrating one manner of using it.
Fig. 3 is a plan view illustrating another manner of using the tool.

Referring to Fig. 1 it will be seen that the tool illustrated comprises a base 10, an upright standard 11 which has its lower end mounted on the base by means of a universal joint 12, a sharpening tool 13 adjustably carried by the upper end of the standard, and an integral rigid handle 14 extending laterally from the upper end of the standard. In addition the upper end of the standard carries an adjustable disc guide 15, the function of which will be explained herein.

A second handle 16 is pivotally mounted by means of removable pivot pin 17 near the inner end of handle 14 in a scissors-like arrangement. The inner end of handle 16 is in the form of a spindle 18 on which a roller 19 is rotatably mounted, and held against end play by means of a sleeve 20 and a nut 21.

The standard 11 is made up of a lower tubular section 22, and an upper section which includes a rod 23 which telescopes into the tube 22, thus permitting overall height variation, as required. A set screw with a wing nut head 24 serves to lock the two sections in any desired relation.

The disc sharpening element 13 is in the form of a lathe type metal cutting tool, and has a tool steel cutting edge 25. It is slidably received and held in a complementally shaped socket formed in the upper end of the standard 11. A set screw 26 holds the cutting tool in the desired position.

Operation

After the disc plow or other agricultural implement has been elevated and supported free of the ground, and a power unit connected to the disc carrying shaft so that the discs are being rotated, the operator spreads the handles 14 and 16 apart to move the roller 19 away from the cutting tool edge 25 so that the peripheral or cutting edge of a rotating disc may be received between these two elements. The tool is then manually maneuvered until it is in the position shown in Fig. 2 with relation to the rotating disc 27, and the disc shaft 28, with the base of the tool firmly seated on the ground. To aid in the firm positioning of the tool on the ground, and to make sure that the base remains in the desired position during the disc sharpening operation, the base 10 is preferably provided with a plurality of spaced depending cleats 29 and 30.

With the tool in the position illustrated in Fig. 2, the operator manually moves the two handles 14 and 16 toward each other. The roller 19 contacts the concave surface of the disc and forces the periphery of the disc into contact with the edge 25 of the cutting tool. The operator holds the tool by its two handles only, and by inward pressure on these handles he governs the speed at which material is removed from the disc. The operator can also determine the angle of bevel at which the cut is being made simply by changing the position of the tool slightly. The re-setting of the cutting tool 13 will also aid the operator in obtaining the desired angle of bevel. If the disc being sharpened is warped and does not rotate true with its shaft, the ball joint 12 permits the tool to move to and fro as the disc rotates, while the base 10 remains firmly seated on the ground.

During the sharpening operation, the guide 15 is adjusted so that its end lightly contacts the convex surface of the disc 27, as clearly shown in Fig. 2, at a location adjacent the disc cutting edge. In case the cutting edge of the disc is nicked, or a portion of the disc periphery is broken away, the guide 15 prevents the disc from being forced toward the cutting edge 25 to such an extent that this cutting edge will lodge in the nick or break. The guide thus serves as a safety feature to prevent the cutting tool 13 from being broken off, and also to prevent the rotating disc from picking up the entire tool and possibly injuring the operator.

In case the discs to be sharpened are dished in a direction opposite to that shown in Fig. 2, it is only necessary to remove pivot 17 and reverse handle 16 to the position shown in Fig. 1. The cutting tool 13 and the guide 15 are then removed from their seats and replaced facing in the opposite direction.

In case the peripheral or cutting edge of any particular disc is damaged too badly, this tool may be used in the manner shown in Fig. 3 to remove a one-half or three-quarter inch ring from the disc. To accomplish this the operator loosens set screw 26 and re-locates the cutting tool 13, as shown. The nut 21, the sleeve 20, and the roller 19 are then removed from the spindle 18. The sleeve 20 is replaced first, then the roller, and then the nut, as in Fig. 3. With the mentioned elements in the positions shown in Fig. 3, pressure on the handles 14 and 16 forces the disc into contact with the corner of the cutting edge 25, and the outer edge of the disc is cut completely off, at the location indicated by the broken lines. The reason for re-locating the roller 19 on its spindle during this cut-off operation is, of course, to prevent the surface of the roller from coming in direct contact with the cutting edge 25 when the final cut-through is accomplished. If it is desired to increase the depth of the disc receiving throat of the tool for this cut-off operation, it is only necessary to move the pivot pin 17 of the handle 16 to the hole 31 in the handle 14, visible in Figs. 2 and 3. After the outer damaged rim of the disc has been removed in this manner, the new disc cutting edge may be sharpened as previously described.

From the above description and explanation it will be seen that I have provided an easily portable tool which is capable of sharpening the cutting discs of farm implements without removing the discs from the implement, and without dis-assembling the implement in any way. The time and labor required for the sharpening operation are thus reduced to a minimum.

Having described the invention with sufficient clarity to enable those familiar with the art to construct and use it, I claim:

1. A tool for sharpening a disc of an agricultural implement during rotation of said disc, comprising: a base; an upright standard mounted thereon; a laterally extending handle mounted rigidly on the upper end of the standard; a disc sharpening element mounted adjustably but rigidly on the upper end of the standard; a second handle disposed in cooperative scissors relation with the first mentioned handle and pivotally connected thereto; and a roller or small wheel rotatably mounted on the remote end of said second handle and adapted to contact and urge a disc into positive engagement with the sharpening element when the handles are moved toward each other.

2. The invention described in claim 1, and means adjustably but rigidly mounted on the standard for selectively limiting the movement of the disc in a sharpening element engaging direction.

3. The invention described in claim 1 in which the standard is variable in length, and has its lower end mounted on the base by means of a universal joint.

4. A tool for sharpening a disc of an agricultural implement during rotation of said disc, comprising: a base; an upright standard mounted on said base; a pair of elongated rigid members pivotally connected together intermediate their ends and mounted transversely on the upper end of said standard; a disc sharpening element mounted near one end of one of said members; an inwardly projecting disc contacting element mounted on the adjacent end of the other member, and adapted to contact a rotating disc and urge it into positive engagement with said sharpening element when the opposite ends of said members are moved in the proper directions.

5. The invention described in claim 4, and means carried by one of said members for limiting the movement of the disc in a sharpening element engaging direction.

6. The invention described in claim 4 and a universal joint serving to mount the standard on the base.

7. The invention described in claim 4 in which the disc sharpening element is a metal cutting tool.

8. The invention described in claim 4 in which the standard is variable in length.

9. The invention described in claim 4 in which the disc contacting element is a rotatably mounted wheel adapted to contact and roll on a side surface of the disc near its periphery for transmitting sharpening element engaging motion to the rotating disc.

WALTER A. BODGE.

REFERENCES CITED

The following references are of record in the file of this patent:

UNITED STATES PATENTS

| Number | Name | Date |
|---|---|---|
| 435,599 | Cobb | Sept. 2, 1890 |
| 436,530 | Markillie | Sept. 16, 1890 |
| 781,198 | Hammond | Jan. 31, 1905 |
| 1,331,596 | Stukart | Feb. 24, 1920 |
| 1,343,342 | Bray | June 15, 1920 |
| 1,406,716 | Bain | Feb. 14, 1922 |
| 1,642,583 | Hanson | Sept. 13, 1927 |
| 2,185,519 | Randall | Jan. 2, 1940 |